United States Patent [19]

Dudrey et al.

[11] 4,366,069
[45] Dec. 28, 1982

[54] COOLANT RECOVERY SYSTEM

[75] Inventors: Denis J. Dudrey, Bloomington; John T. Herman, Mahtomedi; Girma Wolde-Michael, Little Canada; Delmer L. Radeztsky, Bloomington, all of Minn.

[73] Assignee: Donaldson Company, Inc., Minneapolis, Minn.

[21] Appl. No.: 254,751

[22] Filed: Apr. 16, 1981

[51] Int. Cl.[3] .............................................. C02F 1/40
[52] U.S. Cl. .................................... 210/788; 210/776; 210/805; 210/806; 210/138; 210/141; 210/167; 210/197; 210/259; 210/512.1
[58] Field of Search ............... 210/776, 788, 790, 805, 210/806, 138, 139, 140, 141, 142, 143, 167, 197, 258, 259, 512.1

[56] References Cited

U.S. PATENT DOCUMENTS

| | | | |
|---|---|---|---|
| 453,105 | 5/1891 | Bretney | 210/512.1 |
| 1,958,054 | 5/1934 | Linnmann | 210/512.1 |
| 2,010,435 | 8/1935 | Matheson | 210/512.1 |
| 2,360,551 | 10/1944 | Durdin | 210/776 |
| 2,921,684 | 1/1960 | Baker | 210/512.1 |
| 3,265,212 | 8/1966 | Bonsall | 210/259 |
| 3,341,983 | 9/1967 | Baldenhofer | 210/512.1 |
| 3,456,798 | 7/1969 | Urdanoff | 210/788 |
| 3,528,551 | 9/1970 | Herubel | 210/167 |
| 3,540,588 | 11/1970 | Estabrook | 210/788 |
| 3,596,769 | 8/1971 | Baldwin | 210/512.1 |
| 3,679,051 | 7/1972 | Larson et al. | 210/512.1 |
| 3,764,005 | 10/1973 | Zemanek | 210/512.1 |
| 3,840,120 | 10/1974 | Greenberg | 210/167 |
| 4,111,809 | 9/1978 | Pichon | 210/512.1 |
| 4,168,232 | 9/1979 | Allen et al. | 210/167 |
| 4,265,740 | 5/1981 | Luthi | 210/512.1 |

FOREIGN PATENT DOCUMENTS 2411076 9/1975 Fed. Rep. of Germany .

OTHER PUBLICATIONS

Drawing of "Suggested Closed Loop System Layout", Master Chemical Corporation, Drawing No. 0006024, Jan. 23, 1980.

Primary Examiner—Ernest G. Therkorn
Attorney, Agent, or Firm—Merchant, Gould, Smith, Edell, Welter & Schmidt

[57] ABSTRACT

A process for recovering an industrial coolant fluid from a contaminated mixture and restoring the recovered coolant fluid to a predetermined concentration level and an apparatus for carrying out the process are disclosed. The process includes the following steps: (a) removing relatively large and heavy particulate matter from the contaminated mixture, the mixture containing coolant fluid and contaminating oils and solid particulate matter; (b) depositing the partially cleaned mixture into a first container (30) designed and constructed so that a whirlpool motion is imparted to the fluid passing through it; (c) transferring the mixture from the first container (30) to a liquid/liquid/solid separator (50); (d) recovering the separated coolant fluid from the separator (50); (e) introducing the recovered fluid into an inlet (38) of the first container (30) in a direction enhancing a fluid vortex created by the whirlpool movement of the fluid within the container (30) while permitting free oil to rise to the surface of the fluid vortex; (f) repeating steps (c) through (e) until the recovered coolant fluid has been sufficiently separated from the contaminants in the mixture; (g) then transferring the recovered coolant fluid from the first container (30) to a second container (80); and (h) restoring the recovered coolant fluid held in the second container (80) to a predetermined component concentration level.

18 Claims, 14 Drawing Figures

COOLANT RECOVERY SYSTEM

TECHNICAL FIELD OF THE INVENTION

The present invention relates to fluid recovery systems and more particularly to industrial coolant fluid recovery systems. Specifically, the invention relates to a fluid recovery system having multiphase operating modes which include the recirculation of the contaminated fluid mixture in order to recover the coolant fluid, the refortification of the recovered coolant fluid to required proportions in order to reuse the fluid, and the aeration and recirculation of recovered fluid being stored in the system in order to prevent stagnation of the fluid.

BACKGROUND OF THE INVENTION

There is a pressing need in many industries for a solution to the problem of handling contaminated industrial fluids. Industries generally solve their contaminated fluids problems by merely disposing of the fluids after only one use of the fluid. However, in the face of increasing governmental regulations with respect to the disposal of such industrial fluids, and in view of the great expense involved in replacing fluid after only one use, a different solution to the problem is needed.

Attempts have been made to recover the valuable industrial coolant fluid contained within a contaminated mixture for continued reuse. Prior art recovery systems, however, have not fully answered the needs of industry. Single pass methods involving elaborate equipment set ups which are manually controlled and monitored are known in the art but for various reasons are not feasible for use throughout the various industries. Other prior art recovery systems are so designed that they cannot tolerate solids and for that reason are unsuitable for several industries. Oftentimes separate solids filtering devices are added to such recovery systems, but that involves further expense and maintenance problems. Also skimming devices or skimmers for removing the free and mechanically emulsified oils from the contaminated mixture have been commonly used, but they have not always been reliable or efficient as required by the industries. A still further problem with recovery systems of the prior art is the stagnation of recovered fluid which has been stored for lengths of time such as two to three days. Stagnation occurs when the fluid is not periodically aerated, as bacteria and fungus growth is promoted under such conditions and the recovered coolant fluid is then unsuitable for reuse. And finally, these prior art systems have required extensive manual operation for their functions and as such, people must be trained and equipment carefully watched and maintained in order to achieve the objectives of the recovery system.

The present invention is believed to solve the problems of the prior art recovery systems with its unique design and its multi-phase operating modes. The system is fully automated and requires only one or two people to operate the complete invention.

SUMMARY OF THE INVENTION

The present invention relates to a process for recovering industrial coolant fluid from a contaminated mixture and the apparatus for carrying out that process. The contaminated fluid mixture generally includes the coolant fluid, contaminating oils and solid particulate matter. The steps of the process are: (1) first removing relatively large and heavy particulate matter from the contaminated fluid mixture prior to its entry into the main portion of the apparatus; (2) depositing the partially cleaned mixture into a first container having the capacity to create a vortex fluid flow within the container; (3) transferring the mixture from the first container into a liquid/liquid/solid centrifugal separator; (4) the centrifugal separator separating the components of the mixture, with the separated coolant fluid being recovered from the separator; (5) introducing at least a portion of that recovered coolant fluid back into the first container in a direction enhancing the creation of a fluid vortex within that fluid container; (6) while simultaneously with step (5) permitting the free oil to rise to the surface of the fluid vortex so that the free oil is carried upon the surface of the fluid vortex in a "skimming" process to the bottommost located outlet of the container; (7) and repeating the steps of circulating the fluid flow through the first container and the centrifugal separator until a sufficient level of clarity is obtained in the recovered coolant fluid; and finally (8) removing that recovered coolant fluid to a storage location for refortification and subsequent use.

According to one aspect of the present invention, a process for recovering industrial coolant fluid from a contaminated mixture is provided along with the refortifying of that recovered coolant fluid and the refreshing of the recovered coolant fluid in order to prevent stagnation of the fluid while being stored in the system.

Another aspect of the present invention is to provide an apparatus which is of a compact single platform arrangement and which may be automatically controlled.

Still another aspect of the present invention is to provide a recirculation of the contaminated mixture and recovered coolant fluid at preset time intervals and controlled rates of flow.

Still another aspect of the present invention is the elimination of the use of the prior art skimming devices for separating free oil from the contaminated mixture within the semi-clean tank.

And yet another aspect of the present invention is to provide a fully automated system which can accomplish a number of operating modes without necessitating extensive manual control of the apparatus and process.

DETAILED DESCRIPTION OF THE PREFERRED EMBODIMENT

Figure 1:
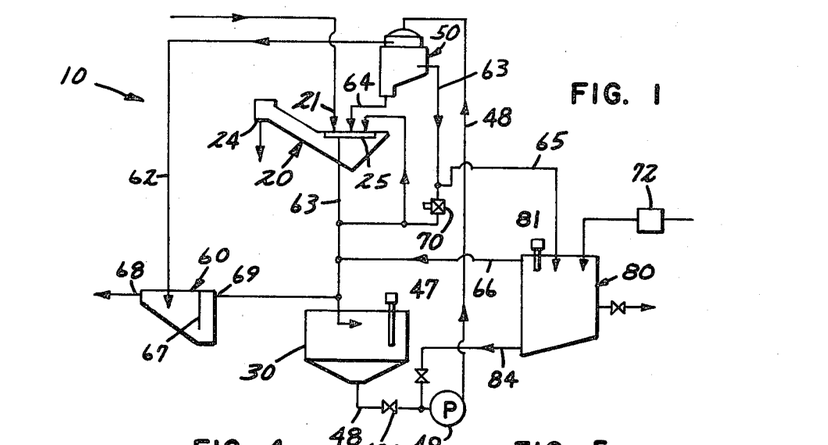
FIG. 1 is a schematic view illustrating the various flow paths of the invention.
Figure 2:
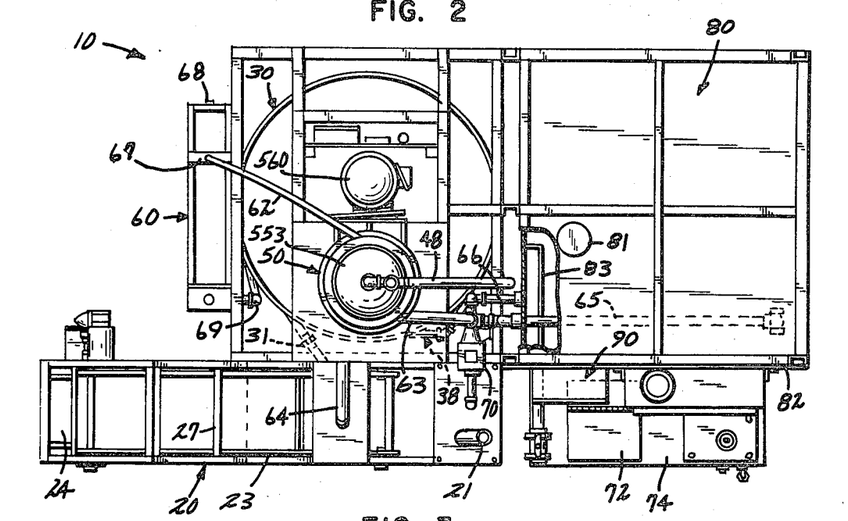
FIG. 2 is a side elevational view of the present invention.
Figure 3:
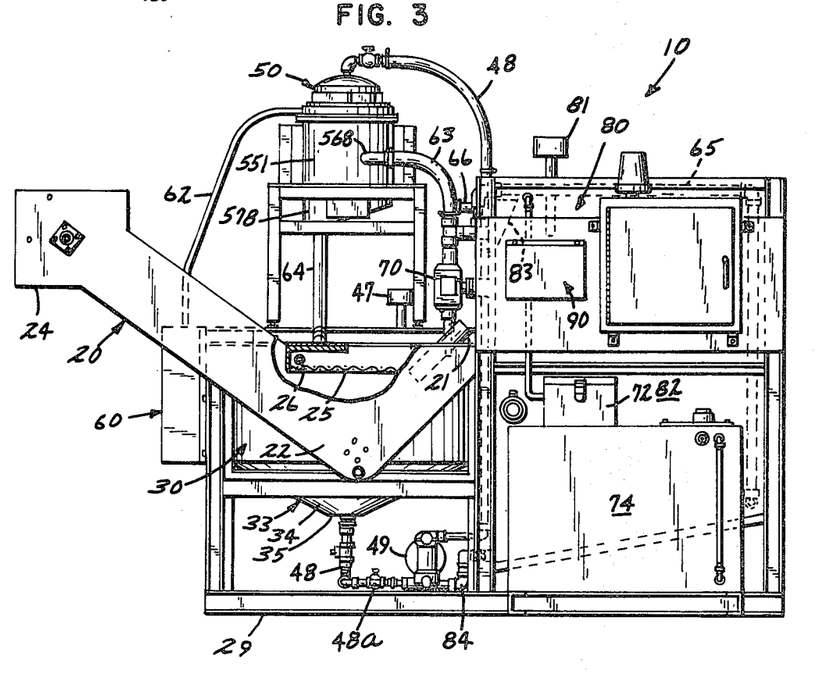
FIG. 3 is a top plan view of the present invention.

Referring now to FIGS. 2 and 3, like numerals will be used to indicate the same or similar items throughout the several views with the numeral 10 indicating the invention in general. A portable sump cleaner or transport tank which is not shown, discharges a batch of the contaminated fluid mixture into the inlet 21 of a drag-out reservoir assembly 20. The drag-out reservoir assembly 20 typically will hold approximately fifty gallons of the contaminated fluid mixture. The assembly 20 serves as a presettling means and relatively large solids discharge means. The shape of the assembly is essentially that of a check mark with the reservoir 22 in the lowermost area and the drag-out means 23 traversing along and inside the bottom of the reservoir area and the longer leg of the assembly. The upper portion of the drag-out means 23 includes an opening 24 for depositing solids in a relatively dry state into a collection chamber (not shown). The complete mechanics of the drag-out assembly 20 are not shown in the drawings as the drag-out reservoir assembly is a small model of standard construction well-known in the art. Added to the standard assembly, however, is a grid or strainer means 25 mounted in a top portion of one side of the reservoir area 22. The strainer means 25 is provided to prevent floating items such as paper cups, cigarette butts, etc. from leaving the reservoir 22 through the assembly's overflow outlet opening 26 into the first or semi-clean container 30.

Positioned adjacent the reservoir area 22 of the drag-out reservoir assembly 20 is a first container 30 also referred to as a semi-clean container 30. The contaminated mixture overflows the drag-out reservoir assembly 20 into the semi-clean container 30 along a conduit 31 or other suitable transfer structure. The semi-clean container 30 in the preferred embodiment is a cylindrically shaped tank having an open top 32 upon which a cover (not shown) can be placed. See FIGS. 4–7. The bottom portion 33 of the tank is substantially frustoconical in shape but could also be a rounded dish shape. The walls 34 in the lowermost area of the container slope downwardly toward a central portion 35 of the container bottom wall 34. A circular outlet opening 36 is formed in the central portion of the bottom wall 35. A vertical axis 37 of the container 30 passes through the center of the outlet opening 36.

Figures 4, 5, 6, 7:
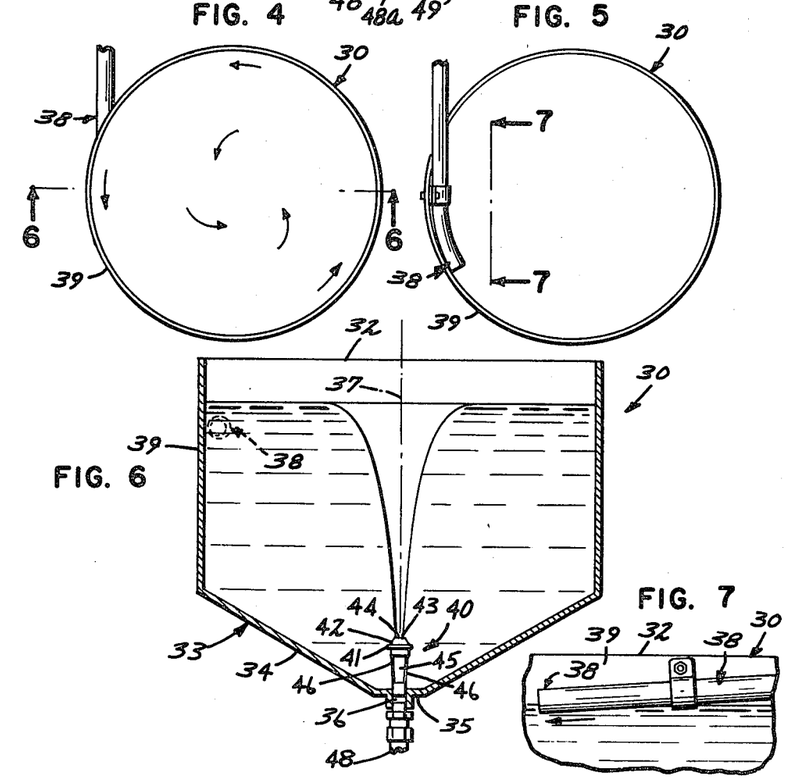
FIG. 4 is a top plan view of a portion of the present invention.
FIG. 5 is a top plan view of another embodiment of a portion of the present invention.
FIG. 6 is a cross-sectional view of a portion of the invention as seen along line 6—6 in FIG. 4.
FIG. 7 is a side elevational view of a portion of the invention as seen along line 7—7 in FIG. 5.

Located along an upper portion of a side of the container 30 is an inlet means which in the preferred embodiment, seen most clearly in FIGS. 4–7, is a tube or pipe 38 positioned tangential to the container 30 so that fluid entering the container 30 through the pipe 38 is initially directed along a side wall 39 of the container 30. Positioned directly above the outlet opening 36 of the container 30 is a means 40 for limiting or altering a vortex flow existing within the tank 30. The means 40 is a device or limiter 40 having an upper member 41 positioned approximately four to six inches above the outlet opening 36. In the preferred embodiment, the upper member 41 is a frustoconical element with sides 42 sloping generally inward and upward towards the vertical axis 37 of the tank 30. The flat top surface 43 of the upper member 41 has an opening 44 therethrough. The opening 44 is centered on the vertical axis 37. In an alternate embodiment, the upper member 41 has the shape of an inverted funnel. An opening extends through the tube portion and is also centered on the vertical axis 37 of the tank 30. An open space or fluid passageway 45 exists between the outlet opening 36 and the upper member 41 of the limiter 40. The upper member 41 is supported above the outlet opening 36 by a pair of stiff rod-like legs 46. The device 40 in the preferred embodiment is screwed into the outlet opening 36, as can be seen in FIG. 6. The limiter's purpose and operation will be discussed in more detail in the operation of the preferred embodiment below.

Fastened rigidly to one side of the semi-clean container 30 is a level probe 47 of standard construction, for example, a capacitance probe. The level probe 47 is positioned for sensing a level of fluid in the tank 30 at approximately thirteen inches from the botom wall 35 of the tank. The semi-clean tank or container 30 has a capacity of approximately 250 gallons and holds fluid for recirculation purposes.

The outlet opening 36 of the first or semi-clean container 30 transfers fluid into a first conduit means 48. In the preferred embodiment, the conduit means 48 is a flexible tubular member such as a plastic piping. The piping 48 allows the fluid from the semi-clean container 30 to pass through to a pump means 49. The pump means 49 used in the preferred embodiment is a system pump 49 which is essentially an air operated diaphragm pump 49 chosen for its ability to minimize the mixing of surface carried oil with the contaminated fluid mixture. The pump is solids tolerant. A pressure switch (not shown) sensitive to the air supply for the diaphragm pump is also provided in order to detect a malfunctioning of the pump. The pump 49 is a standard type well known in the field and is connected to the semi-clean tank 30 by means of the plastic piping 48 and a typical open ball valve 48a. Both the tank 30 and the pump 49 are supported by and attached to a metal skid or platform 29. The fluid is pumped on through the first conduit means 48 by the air operated pump 49 into a liquid/liquid/solid centrifugal separator 50.

Figure 8:
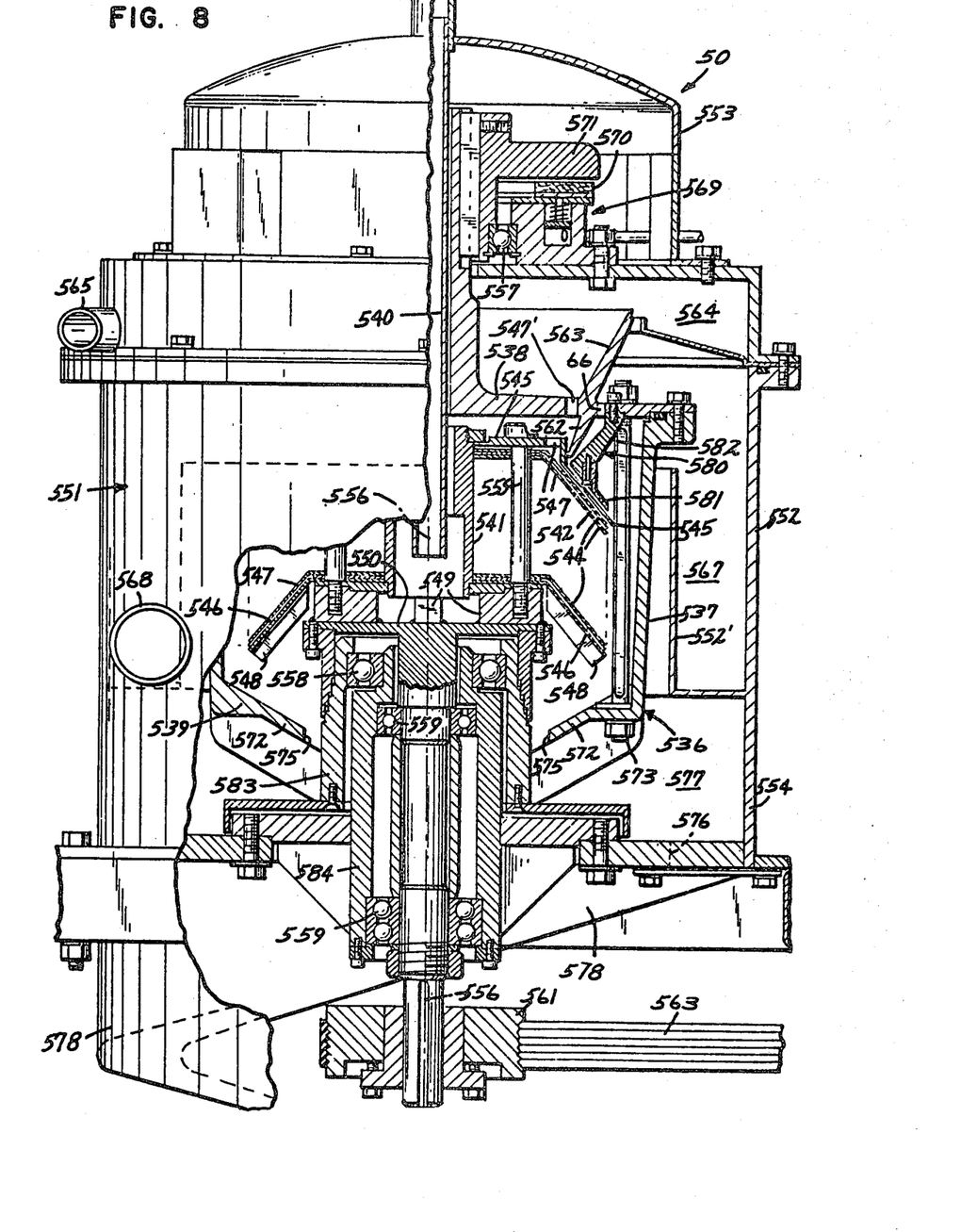
FIG. 8 is an elevational view of one apsect of the present invention with portions broken away and shown in cross-section.
Figure 9:
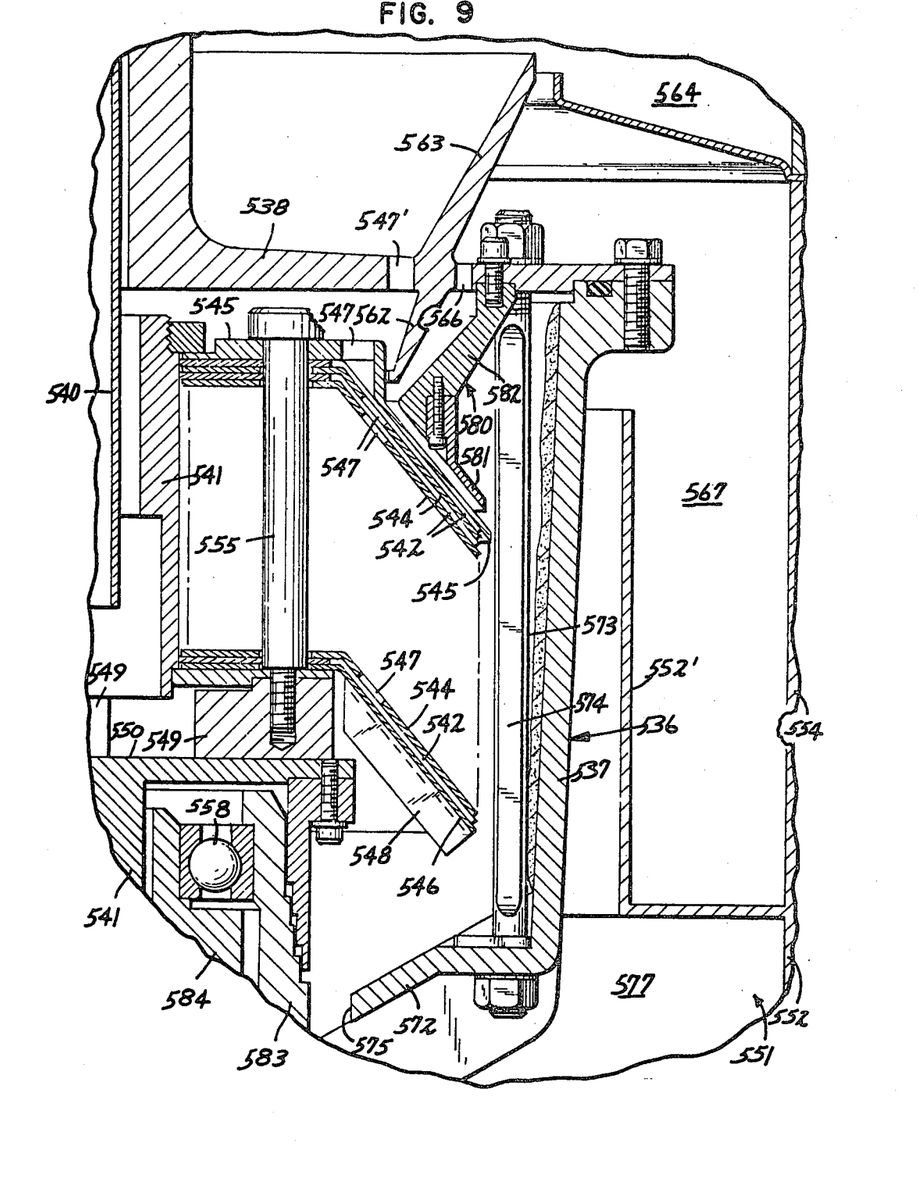
FIG. 9 is a greatly enlarged view of the portion of the present invention shown in FIG. 8.

Referring now to FIGS. 8 and 9, the separator 50 is mounted above the semi-clean tank 30 and the drag-out assembly 20 as can be seen in FIG. 2. The separator 50 is designed to remove mechanically emulsified oils, free oils, and fine solids from the water-based contaminated fluid mixture. The separator 50 is specially designed to remove the contaminating oils yet will not split the chemically emulsified oils within the water-based coolant liquid itself. Referring now to FIGS. 8 and 9, the construction of the centrifugal separator 50 can be best understood.

The separator 50 has a drum 536, including a cylindrical side wall 537, a top wall member 538 and a frustoconical bottom member 539. The periphery of the bottom member 539 is attached to the bottom edge of the side wall 537 and the center extends into the drum 536. The rotor assembly includes a portion of the stationary inlet manifold 540, a shaft 541, a disc assembly mounted to the shaft 541, and radial spacers 542 secured within the disc assembly. The inlet manifold 540 is fixed to a portion of the housing cover 553, and extends downwardly from the housing cover 553 through the drum top wall member 538 and into the rotor disc assembly. In the embodiment shown, the disc assembly is a nested arrangement of spaced apart truncated cone discs 544, including a topmost and bottommost disc 545, 546, respectively. The shape of each disc 544, 545, 546 is basically a central flat circular portion from which extends downwardly a sloping annular peripheral portion. The sloping portion is the frustoconical surface of the disc and is shown sloping at a 50° angle from the plane of the flat surface portion. The radial spacers 542 maintain the spaced apart relationship between adjacent discs. Each spacer 542 is a finger plate secured between adjacent discs. Each of the discs 544, not including the topmost 545 and the bottommost 546 discs, has a circular arrangement of holes or apertures 547 along its conical surface. The topmost disc 545 has its openings 547 formed in the horizontal upper portion thereof, generally in vertical alignment with the openings 547 of the discs 544. The circular patterns of the disc apertures 547 are aligned within the assembly to allow light liquid to flow upward as the disc assembly rotates. The bottommost disc 546 has attached along the underside of its conical portion a set of three fins 548 extending generally downward from the disc surface in the flow path of the incoming contaminated fluid mixture. The fins 548 are spaced apart at substantially equal intervals along the disc surface. A set of paddles 549 is mounted to a rotor shaft 550 head positioned below the truncated portion of the bottommost disc 546 of the rotor assembly. The rotor shaft head 550 is mounted in the drum 536 for coaxial rotation with the rotor assembly. Each paddle 549 is of rectangular shape and extends upward towards the bottommost disc 546 and radially outward from the rotor shaft 541. The paddles 549 are mounted at substantially equal intervals with respect to each other about the rotor shaft head 550.

The drum 536 and the rotor assembly are mounted in a housing 551 having a generally cylindrical body 552, a top cover 553, and a bottom portion 554. The assembly of nested discs 544, 545, 546 is secured to the rotor shaft head 550 by a plurality of shoulder screws 555. The drum and the rotor assembly are concentrically mounted and rotate independently about a vertical axis 556. It can be seen that the drum 536 rotates on bearings 557 mounted in the housing cover 553 and bearings 558 mounted between a drum hub 583 portion and the bearing sleeve 584. The rotor assembly is rotatably mounted by bearings 559 mounted between the bearing sleeve 584 and the rotor shaft 541. A motor 560 drives the rotor assembly by means of a belt 563 and a pulley 561 mounted on the rotor shaft. The directions of rotation for the drum 536 and the rotor assembly are generally counterclockwise when viewed from the top.

The contaminated fluid mixture containing the liquids of differing density, a light liquid, e.g., a chemically emulsified oil, a heavier liquid, e.g., a water-based coolant, and solid particles, e.g., metal chips, enters the separator through the inlet manifold 540 extending to the bottom of the disc assembly. The contaminated fluid drops onto the rotor shaft head 550 where it is thrown or directed outwardly by the rotating set of paddles 549, into contact with the rotating fins 548 extending below the bottommost disc 546 where it is further accelerated toward the drum side wall 537. The drum 536 is then driven by the viscous or shear forces associated with the rotating fluid. In steady state operation, the rotor assembly is driven at about 3600 rpm. The rotation rate of the drum 536 lags behind that of the rotor assembly by 100–300 rpm. As the drum 536 and rotor assembly rotate, a wall of fluid is built up along the side wall 537 of the drum 536. Centrifugal forces cause the solid particles in the fluid to be thrown radially outward to accumulate in the portion of the fluid wall closest to the side wall 537 of the drum 536.

As the wall of fluid builds upward and flow continues to enter the separator 535, the solids heavier than the fluid separate and move to the drum side wall 537. The lighter liquid separates from the heavier liquid within the disc assembly and flows upward along the surfaces of the individual discs 544, 546. As the light liquid collects toward the portion of each disc, it eventually overflows into the apertures 547 of the discs 544, 546 and proceeds upward towards the upper portion of the disc assembly where it then overflows out of the top disc apertures 47 and is guided upward to the drum top wall member 538 by a downwardly extending annular baffle member 562. As the clarified light liquid moves upward along the baffle member 562, it overflows out of the drum 536 through light liquid discharge openings 547' provided in the top wall member 538 of the drum 536. The clarified light liquid then flows along a second baffle-like member 563 extending upward from the drum top wall member 538 where it is guided to an upper collection chamber 564 and then removed through a light liquid outlet 565 in its clarified state. The light liquid outlet is connected to a tramp oil concentrator 60 by a second conduit means 62 of plastic piping. The concentrator 60 will be discussed below. The topmost disc 545 of the rotor assembly has a greater diameter than the other discs 544, 546. The lip portion formed by the greater diameter prevents the light liquid flow from proceeding to the heavier liquid discharge openings 566 in the drum top wall 538, by trapping the light liquid flow within the disc assembly.

The heavier liquid separates from both the light liquid and the solids and flows upward near the outer side edges of the disc assembly. When the flow has reached the level of the top disc 545, it flows radially inward between the top disc 545 and a parallel portion 581 of an extension means 580. The extension means 580 is a fixed structural member for preventing carry-over of a contaminated fluid and solids into the disc assembly and liquid discharge openings 547', 566, during the purge cycle. Generally, it is an angled, annular member mounted between the drum side wall 537 and the heavier liquid openings 566 in the drum top wall member 538. A portion 581 of the means 580 extends substantially parallel and close to a portion of the conical surface of the topmost disc 545 in the rotor assembly. It is in this gap between the parallel extension portion 581 and the conical surface of the top disc 545 that the clarified heavier liquid flows upward and inward. As it passes the parallel portion 581 of the extension means 580, it then proceeds generally upward in the space between the baffle member 562 and an extension portion 582 where it overflows the drum 536 through the circular arrangement of heavier liquid openings 566 in the drum top wall member 538. As the clarified heavier liquid passes through the openings 566, it enters a lower collection chamber 567 from which it is subsequently released from the separator 50 through a heavy liquid outlet 568. In the embodiment shown, the outlet 568 returns the separated heavier coolant fluid to the semi-clean container through a third conduit means 63, e.g., plastic piping. The upper collection chamber 564 is defined by the area between the housing 551 and the drum top wall member 538. The lower collection chamber 567 is defined by the separator housing body 552 and an internal wall 552' of the housing. Each chamber is separate from the other.

An air brake 569 is used to slow and stop the drum 536 when the purge cycle is initiated. When the brake 569 is actuated, a shoe 570 is driven upwards and held against a projection 571 which is in effect an extension of the drum 536.

An annular wall or baffle 572 extends from the bottom of the drum side wall 537. An opposite apex thereof defines an edge or lip opening 575 into which the fluid containing the resuspended particles flows during the flow cycle. The edge opening 575 is formed inwardly of the baffle 572 and beyond the centers of the clarified light liquid openings 547' in the drum top wall 538. Note that the peripheral edges of the rotor disc assembly extend beyond the outermost edges of the clarified heavier liquid openings 566. Particles, as stated above, accumulate during the separation process on the drum side wall 537 between the drum top wall member 538 and the baffle 572. A pair of purge rods 573 are bolted to the inside of the drum 536 near the side wall 537 so as to extend from the drum top wall member 538 to the inner edge of the baffle 572. The rods 573 are positioned opposite each other in the drum 536. Each rod 573 has a generally circular cross-section, but a longitudinal flat surface portion 574 along the rod length is also provided. Each rod's flat surface faces opposite the direction of the rotation of the drum and rotor assembly.

When the drum 536 is stopped or slowed, the rotor assembly continues to rotate. The fluid is disrupted and the accumulated particles are penetrated by fluid flow diverted as a result of impacting the flat surfaces 574 of the purge rods 573. The particles are then resuspended in the fluid. As the purge cycle continues, the fluid and the resuspended particles flow inwardly and downwardly along the upper surfaces of the baffle 572, downwardly through the lip openings 575 and the opening 576 leading from the solids collection chamber 577. The purged fluids and solids then exit the separator through a ramp-like outlet 578. This outlet 578 is connected to the drag-out reservoir assembly 20 by a fourth conduit means 64, e.g., plastic piping. The purged solids are then disposed of via the drag-out means 23.

The separator flow rates will vary from five to twelve gallons per minute, as the separator 50 is designed to allow several passes through it prior to the diversion of the recovered coolant fluid to a clean tank 80.

The clarified light liquid removed from the centrifugal separator 50 through the light liquid outlet 565, is transferred by the second conduit means 62 to a tramp oil concentrator 60. The tramp oil concentrator 60 is mounted to a side of the semi-clean tank 30 and is provided to further separate the light liquid from any accompanying heavy liquid (coolant fluid). The oil concentrator 60 is of a standard design. The tank of the concentrator 60 includes a strategically positioned baffle 67 and overflow ports 68, 69. The light liquid from the separator 60 is further separated by the concentration of oil on one side of the baffle 67 and concentration of the coolant fluid on the other side of the baffle 67. The oil is drained off through one of the ports 68 to a storage container (not shown) while the recovered coolant fluid is returned to the semi-clean tank 30 by way of the second overflow port 69 and any suitable conduit means such as flexible piping, etc.

The recovered heavier coolant fluid is removed from the centrifugal separator 50 through its respective outlet 568 where it flows into the third conduit means 63, which feeds into the tangentially oriented inlet 38 of the semi-clean container 30. Operably connected to the third conduit means 63 is a valve means 70 for diverting flow from its normal return path to the first container 30 into a second container 80. The preferred valve means 70 is a diverter valve 70 of a standard construction operable in two positions. A first or open position allows the recovered coolant fluid to flow through the third conduit means 63 into the semi-clean container 30. The second or closed position diverts the fluid flow to the second container or clean tank 80 through a fifth conduit means 65. The valve switching is controlled by the microprocessor 90 as described below.

The clean tank 80 is positioned along the side of the semi-clean tank 30 opposite the side on which the tramp oil concentrator 60 is mounted. The clean tank 80 has a preferred capacity of approximately 500 gallons, and provides the required storage necessary for the recovered coolant fluid. The clean tank 80 shown in the preferred embodiment has a rectangular cross-section; however, it should be understood that the clean tank construction may also be circular in cross-section or any other suitable design. The clean tank 80 may be provided with a cover. Positioned on the clean tank 80 is a level probe 81, which can be a capacitance probe, for example. The level probe is positioned so as to be approximately one inch below the overflow level of the fluid contained in the clean tank 80. Proximate the overflow level at one corner of the tank 80 is positioned a baffle 83 which feeds fluid overflow into a sixth conduit means 66 for transfer into the semi-clean tank 30. Fluid overflow from the clean tank 80 to the semi-clean tank 30 is allowed for purposes to be discussed hereinafter. Also mounted on the side 82 of the clean tank 80 are other elements of the apparatus control means 90, including an overflow valve, a power box with included terminal blocks, electric contactors, wiring, indicator lights, start button, etc., and the control circuitry. While the overflow area and baffle 83 are located between the two tanks, the electric boxes are on the side 82 adjacent the drag-out assembly 20. Also provided is a conduit means 84, i.e., plastic piping, connecting a bottommost portion of the clean tank 80 to the system pump 70. The purpose of this conduit means 84 is to allow a complete draining of the clean tank 80 when necessary for maintenance or general cleaning purposes.

A proportional mixer or a proportioner 72 as it is commonly referred to in the trade, of standard construction, is mounted on the side 82 of the clean tank 80. The proportioner is preset by dial means to obtain the required coolant concentrate/water mixture. If the level probe 81 on the clean tank 80 "senses" that the clean tank is less than full after the recovered heavier liquid is transferred from the separator 50 to the clean tank 80, the proportioner 72 is instructed by the control system 90 to correct the situation and will add a sufficient amount of additives and water to replenish and fill the clean tank 80 to an overflow level. The objective is to have a full clean tank 80 and a sufficient amount of overflow returned into the semi-clean tank 30 to keep the semi-clean tank 30 in a "ready state" to be discussed hereinafter.

Also provided is a concentrate storage container 74 having a capacity of fifty to eighty gallons. It is welded to the underside portion of the clean tank 80 and is provided merely for convenience and aesthetic purposes in order to eliminate the accumulation of numerous barrels containing the additives and water necessary for the proportioner 72.

Figure 14:
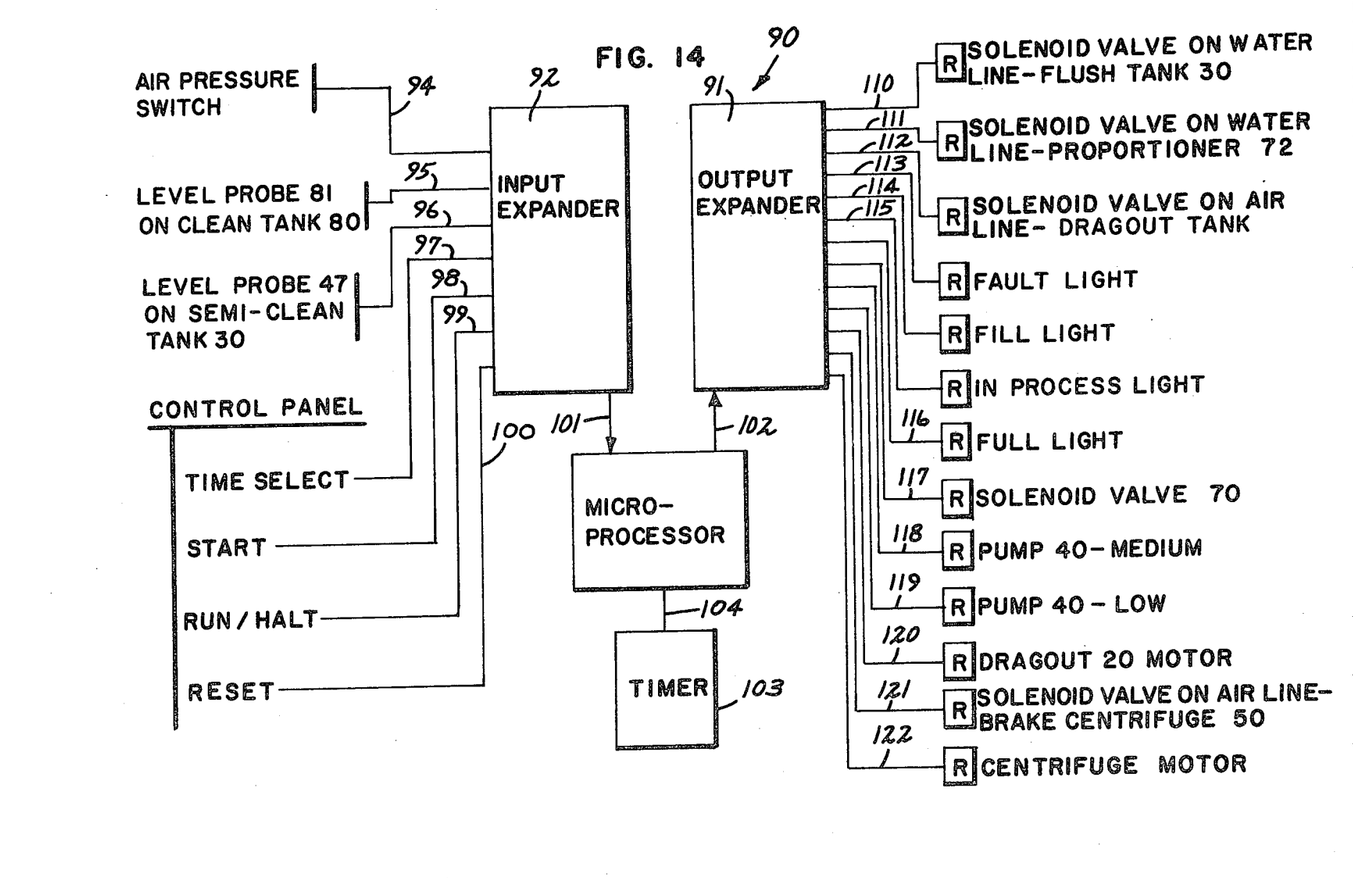
FIG. 14 is a block diagram of the automatic electronic control system for the invention.

The control system used in the preferred embodiment of the invention is disclosed in FIG. 14 and the program listing and flow charts in the appendix to this specification. Referring to FIG. 14, control system 90 in the preferred embodiment consists of a microprocessor 91 and appropriate input and output devices. A microprocessor system is used because of its flexibility and relatively low cost, but of course other types of control systems such as hardwired logic could be used. The inputs to the system are as follows.

An air pressure switch is connected via lead 94 to one input of an input expander 92. This air pressure switch is mounted on the air supply line to air-driven pump 40, and signals in the event of inadequate pressure so that the system can be stopped in order to avoid damaging the pump. Level probe 81, on clean tank 80, connects via lead 95 to another port of input expander 92. Level probe 47, on semi-clean tank 30, connects via lead 96 to another port of input expander 92. Several control panel switches connect to further ports in input expander 92. A switch for selection of process time connects via lead 97. A Start switch connects via lead 98. A Run/Halt switch connects via lead 99, and a Reset switch connects via lead 100.

Input expander 92 communicates with microprocessor 91 over data lines 101. Output commands for microprocessor 91 are conveyed over data lines 102 to output expander 93. Output expander 93 has a plurality of output ports which communicate, through appropriate solid state relays, to the various output functions as follows:

Lead 110 connects from an output port of expander 93 through a relay (indicated by the block with the R inside) to a solenoid valve on a water line positioned to flush tank 30. This function is not used during operation of the process, but is used to flush tank 30 after the end of the process when fluid is removed from tank 30. Another output port connects via lead 113 through a relay to a solenoid valve on the water line for proportioner 72. Another output connects via lead 112 through a relay to a solenoid valve for an air line to the dragout tank 20. This air line is used during the off cycle of the system to bubble air up through the dragout tank. Further output ports connect via leads 113-116 to control panel indicator lights for FAULT, FILL, IN PROCESS, and FULL, respectively.

An output port connects via lead 117 to solenoid valve 70. Lead 118 connects from the output expander to control pump 40 at medium speed, and lead 119 connects to control pump 40 at low speed. The motor in dragout 20 is controlled from a port of the output expander via lead 120 and a suitable relay. The air brake on centrifuge 50 is controlled by a solenoid operated from an output port via lead 121. Lead 122 connects from an output port from expander 93 to operate the motor of centrifuge 50, through an appropriate relay or contactor.

A timer 103 is connected via lead 104 to an interupt line of microprocessor 91. It is set to interupt the microprocessor at one second intervals to return control to the executive program, from where control then branches to the appropriate mode. The detailed operation of the control system is set forth in the flow charts and program listings in Appendix A to this specification. The overall operation of the various mode in carrying out the fluid recovering operation of the present invention is set forth as follows.

Operation of the Preferred Embodiment

The fluid coolant recovery system has a number of automatic operations and features which will now be explained in view of FIGS. 10-13. These features include (1) the removal of large and small solid particulate, as well as free and emulsified tramp oil from any given batch of contaminated coolant fluid, (2) the refortification of any recovered coolant fluid to desired proportional properties by the use of additives at the end of the recovery cycle, and (3) the storage, refortification, and aeration of the coolant fluid until it is transferred from the recovery system to its usage destination. The system accomplishes these tasks in a number of stages which are described as follows.

Figure 10:
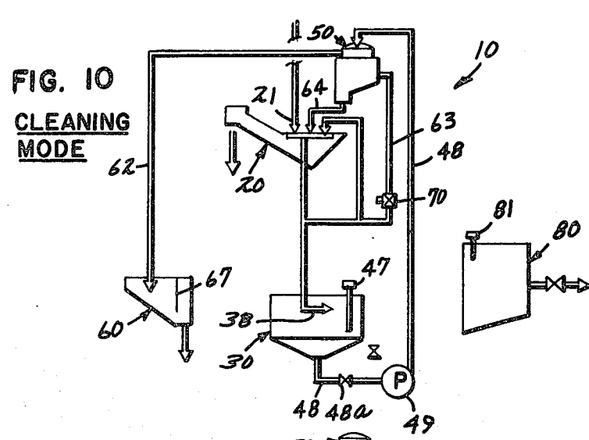
FIG. 10 is a schematic view of the cleaning mode of the present invention.

Referring now to FIG. 10, the drawing shows a schematic view of the liquid flows involved in the cleaning mode of the system. The incoming batch of contaminated coolant fluid mixture is introduced into the the drag-out assembly 20 through the inlet 21. The contaminated fluid mixture is allowed sufficient residence time in the drag-out reservoir assembly 20 to cause substantially all of the large and/or heavy particles to settle out under the forces of gravity and to thus be removed from the system by the drag-out conveyor chain 27 in a relatively dry state. The conveyor chain 27 has been started by this time as a result of the operator pushing the system's start button. The microprocessor 90 which controls all the system components and processes, is responsive to this start button and will subsequently start the centrifugal separator 50 after the drive chain 27 has been started. Concurrent with the starting of the centrifugal separator 50, the partially cleaned batch of coolant fluid overflows from the assembly 20 through the grid or strainer means 25 into the semi-clean tank 30. The contaminated coolant fluid mixture fills the semi-clean tank 30, at which time the system pump 49 is started for the removal of the fluid mixture from the semi-clean tank 30 to the centrifugal separator 50. The microprocessor has by now measured with the aid of the appropriately positioned pressure switches and level probe 47, the amount of coolant fluid mixture that is present in the semi-clean tank 30, and determines how long that batch needs to be recirculated through the centrifugal separator 50 in order to clean the coolant fluid to the degree of clarification necessary for reuse purposes. The microprocessor 90 has also activated the proper pump controls which will give the centrifugal separator 50 the appropriate flow ratio for recirculation purposes. The fluid mixture is pumped from the semi-clean tank outlet 36 to the separator inlet 540 where it begins the separation process described above in the description of the separator of the preferred embodiment. Once inside the centrifugal separator 50, the coolant fluid mixture encounters the strategically designed and positioned discs as well as a centrifugal force field. The disc assembly and the centrifugal force field greatly enhance the weight differences between the contaminants which by this time are small in size and impossible to separate within a reasonable amount of time by normal gravity. The result of this weight difference enhancement is a very efficient separation of the contaminants from the coolant. The oil portion of the contaminants being lighter than the coolant fluid, moves inward within the centrifugal separator 50 and out of the light liquid outlet 565 to the tramp oil concentrator 60. This outlet 565 is connected by piping 62 to the oil concentrator tank 60 as described earlier. The solid particulates will move outward within the centrifugal separator and be deposited against the bowl wall and later during the processor ordered purge cycle, they will be deposited into the drag-out reservoir assembly 20 for removal from the system 10 in a semi-dry state. The processed coolant fluid will then exit the centrifugal separator 50 through its respective outlet 568 and flow back into the semi-clean tank 30 through the conduit means 63, and be readily remixed with the rest of the batch. This remixing is accomplished by strategically placing the centrifugal outlet piping 63 in the tangentially positioned inlet 38 of the semi-clean tank 30. As the fluid is entering the tank 30 in a tangential manner, the pump 49 continues to draw the fluid mixture out of the outlet opening 36 and on into the centrifugal separator 50 where the separation of another portion of the contaminated mixture is carried on as discussed above in the description. Note, however, that the flow from the separator 50 re-entering the tank 30 through the inlet 38 does so in a plane substantially perpendicular to the vertical axis 37 of the semi-clean container 30 and near the liquid surface level of the container's contents, usually either just below or just above the fluid surface level. In combination with the downwardly sloping side walls 34 of the semi-clean container 30 and the bottom outlet opening 36 through which the container's vertical axis 37 passes, the entering tangential flow of the returning coolant fluid imparts a rotational velocity to the container's fluid contents. This rotational velocity in combination with the natural tendency of draining liquid to swirl creates a fluid vortex and whirlpool in the container. The free oil within the contaminated mixture naturally separates and will rise to the top of the fluid vortex surface. In the prior art, various mechanical skimming devices were used to remove the oil which would naturally accumulate on the surface of the fluid held in the prior art settling tanks. A direct result, however, of the vortex forces created within the container of the present invention is the elimination of the need for such skimming devices. As illustrated in FIG. 6, the quick drawing of all the surface collected oil down into the whirlpool's central rotating surface substantially along the vertical axis 37 and out the outlet opening 36 to the preferred air operating pump 49 for transfer to the liquid/liquid/solid separator 50 allows for a final and efficient separation of the oil from the coolant fluid within the separator 50. Just prior to exiting the container outlet, the fluid vortex flow is limited or interrupted by means of the vortex flow limiting device 40. Because of the use of an air operated pumping means 49, the air intake from the semi-clean tank outlet opening 36 must be reduced below that amount which would naturally exit the outlet opening given the fact that the vortex air core travels substantially along the container's vertical axis 37. If not limited, there is an excessive amount of free oil carried on the vortex surface and the air from vortex air core itself which enter the pump 49 and the centrifugal separator 50 causing problems with the functioning of both elements. Thus a certain amount of fluid mixture must be allowed to enter the conduit means 48 with the air core and surface oil. The vortex limiting device 40 achieves this objective of providing a very limited amount of "remixing" of the contaminated coolant fluid or heavy liquid, the light surface oil, and the air entering the separator 50 in order to obtain the most efficient operation of the liquid/liquid/solid centrifugal separator.

Figure 11:
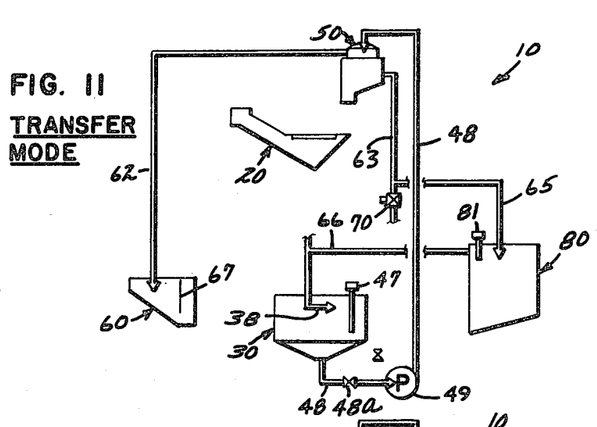
FIG. 11 is a schematic view of the transfer mode of the present invention.

After the coolant fluid mixture has recirculated for its total alloted time, the microprocessor 90 instructs the pneumatically operated overflow valve 70, the diverter valve, which is located connected in line with the piping 63 from the heavy liquid outlet for the recovered coolant fluid, to close. This action causes a slight back-up of fluid above the valve 70 into a T section located a short distance above the valve 70, and on into the piping 65 leading into the clean tank 80. A secondary result of this valve action and subsequent fluid back-up then is the transference of fluid from the semiclean tank 30 through the centrifugal separator 50 at a flow rate determined by the microprocessor 90, which rate is conducive to the most efficient separator operation and finally then on into the clean tank 80 as the batch of fluid exits the centrifugal separator 50. This is the transfer mode of the system as schematically shown in FIG. 11.

Figure 12:
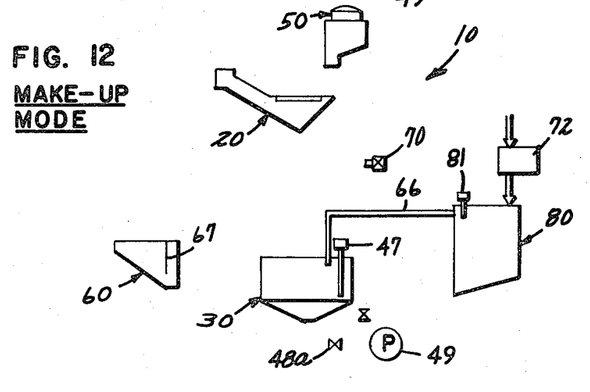
FIG. 12 is a schematic view of the make-up mode of the present invention.

Subsequent to the transfer mode is the operation of the makeup mode shown in FIG. 12. Once the clean recovered coolant fluid has been transferred into the clean tank 80, the microprocessor 90 checks the level of the clean tank by way of a pressure switch on the level probe 81 to see if the clean tank 80 has been filled by the transference. If the microprocessor 90 is instructed that the overflow level has not been achieved, it will then activate the coolant concentrate/water proportional mixture, the proportioner 72, and the tank 80 will be filled sufficiently to a level which will overflow a preset amount back into the semi-clean tank 30 past the clean tank baffle 83 and through an overflow pipe into the semi-clean tank. The overflow coolant fluid will be used later in the off cycle mode which is now discussed with reference to FIG. 13.

Figure 13:
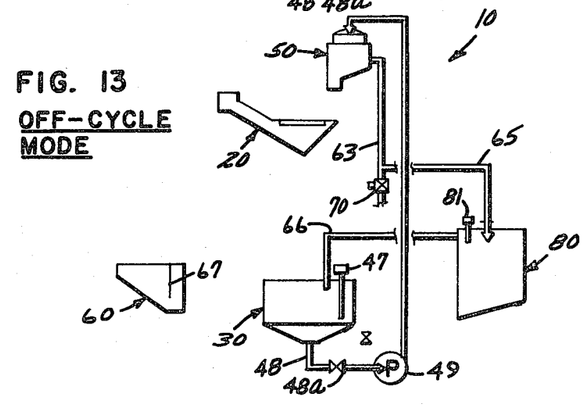
FIG. 13 is a schematic view of the refreshing or off cycle mode of the present invention.

The off cycle mode has as its objective the refreshing of the coolant fluid being stored in the clean tank 30. For preventive purposes the off cycle mode is initiated after approximately three hours have elapsed since the last portion of coolant fluid was removed or the system was last operated. The microprocessor 90 starts the centrifugal separator 50 and the pump 49 to recirculate the residual coolant stored in a semi-clean tank 30 back through the centrifugal separator 50, into the clean tank 80 where it will overflow, carrying any floating material not previously removed, back into the semi-clean tank 30. Also, air is bubbled into the drag-out reservoir assembly 20 to prevent stagnation on the fluid being held therein and to cause oil and scum to float out via the rising air bubbles. What is achieved in this off cycle mode is an aeration of all of the stored coolant fluid within the apparatus 10 in order to prevent stagnation of bacteria and fungus growth in the valuable recovered coolant fluid.

In conclusion, the system possible with the disclosed apparatus provides operational features not known in the prior art, which include the following: (1) informing the operator as to when a batch is in process, (2) informing the operator as to when the clean tank and semi-clean tank are full of clean coolant fluid, i.e., meaning that some coolant fluid needs to be removed before any more can be added for processing, and (3) making sure that all coolant fluid has been transferred into the clean tank before the proportional mixture is activated. (4) informing the operator as to when another batch of contaminated coolant fluid mixture should be added, (5) shutting down each system component as well as starting each system component as required, (6) shutting down the system and alerting the operator whenever a fault has occurred within one of the main components, i.e., the pump controls, the centrifugal separator, the overflow valve, etc. of the recirculation and transfer system.

What is claimed is:

1. A process for recovering an industrial coolant fluid from a contaminated mixture, the mixture containing the coolant fluid, contaminating oils and solid particulate matter, comprising the steps of:
   (a) removing relatively large and heavy particulate matter from the contaminated mixture;
   (b) depositing the partially cleaned mixture from which particulate matter has been removed into a container having a fluid outlet in the lower portion thereof;
   (c) imparting a vortex flow to the fluid in the container so that free oil which has risen from the mixture and is carried on the surface is drawn down to the outlet of the container;
   (d) transferring mixture and free surface oil from the outlet container to a centrifugal separator;
   (e) separating coolant fluid, free oil, and solids from the mixture in the centrifugal separator;
   (f) reintroducing at least a portion of the separated coolant fluid into the fluid vortex within the container;
   (g) repeating steps (d) through (f) until a sufficient level of clarity is obtained in the recovered coolant fluid; and
   (h) removing the recovered coolant fluid for subsequent reuse.

2. The process as recited in claim 1 further including the step of refreshing recovered coolant fluid by
   (a) recirculating the coolant fluid through the separator;
   (b) returning the refreshed coolant fluid to the container for continued storage; and
   (c) repeating steps (a) and (b) after a predetermined storage time interval has elapsed.

3. The process as recited in claim 1 wherein the step of removing relatively large and heavy particulate matter includes:
   (a) initially depositing the contaminated mixture into a dragout-reservoir assembly;
   (b) allowing sufficient residence time for a portion of the particulate matter to settle out of the mixture to a bottommost location of the assembly; and
   (c) conveying the settled matter to a location apart from the partially cleaned contaminated mixture.

4. The process as recited in claim 1 wherein the step of imparting vortex flow to the container includes:
   (a) draining the fluid from the container through a bottommost located outlet of the container;
   (b) allowing the resulting naturally occurring whirlpool action in the draining fluid to occur without substantial interference; and
   (c) simultaneously introducing a portion of the recovered fluid from the separator into the container through a tangential inlet positioned near the fluid surface level of the container so that the fluid vortex created by the whirlpool action is enhanced.

5. The process as recited in claim 1 further including the steps of:
   (a) transferring the fluid from the first-mentioned container to a second container; and
   (b) restoring the fluid to a predetermined concentration level within the second container for subsequent reuse.

6. A process for recovering an industrial coolant fluid from a contaminated mixture and restoring the recovered coolant fluid to a predetermined concentration level, the contaminated mixture including the coolant fluid and contaminating oils and solid particulate matter, the process comprising the steps of:
   (a) removing relatively large and heavy particulate matter from the contaminated mixture;
   (b) depositing the partially cleaned mixture into a first container designed and constructed so that a whirlpool motion can be imparted to fluid passing therethrough;
   (c) transferring the mixture from the first container to a liquid/liquid/solid separator;
   (d) recovering the separated coolant fluid from the separator;
   (e) introducing the recovered coolant fluid from the separator into an inlet of the first container in a direction enhancing a fluid vortex created by the whirlpool movement of the fluid within the container while permitting free oil to rise to the surface of the fluid vortex so that the free oil is carried upon the fluid vortex surface to a bottommost located outlet of the first container;
   (f) repeating steps (c) through (e) until the recovered coolant fluid has been substantially separated from the contaminants in the mixture;
   (g) transferring the recovered coolant fluid from the first container to a second container; and
   (h) restoring the recovered coolant fluid held in the second container to a predetermined component concentration level.

7. The process as recited in claim 6 further including the step of refreshing recovered coolant fluid being held in the containers by
   (a) recirculating the stored coolant fluid through the separator;
   (b) returning the refreshed coolant fluid to either one or both of the containers for continued storage; and
   (c) repeating steps (a) and (b) after a predetermined storage time interval has elapsed.

8. The process as recited in claim 6 wherein the step of removing relatively large and heavy particulate matter includes:
   (a) initially depositing the contaminated mixture into a dragout-reservoir assembly;
   (b) allowing sufficient residence time for a portion of the particulate matter to settle out of the mixture to a bottommost location of the assembly; and
   (c) conveying the settled matter to a remote location outside the assembly apart from the remaining contaminated mixture.

9. The process as recited in claim 6 wherein the step of introducing coolant fluid into the first container in a fluid vortex enhancing direction includes:
   (a) draining the fluid from the first container through the bottommost located outlet;
   (b) allowing the resulting natural whirlpool effect of the draining fluid to occur without interference; and
   (c) simultaneously introducing a portion of the recovered fluid from the separator into the first container through the inlet, the inlet being positioned so as to introduce the fluid in a tangential direction near the fluid surface level fo the first container so that the fluid vortex created by the whirlpool action is enhanced.

10. An apparatus designed to recover a coolant fluid from a contaminated fluid mixture, the mixture also containing various oils and solid particulate matter, said apparatus including:
   (a) a first container adapted to receive the mixture, said container having a generally circular cross-section, a centrally located, bottommost outlet, and inlet means for introducing a fluid into said container in a manner so as to create with said outlet a fluid vortex, said fluid vortex having a central portion defining a rotating surface through said fluid to said outlet;
   (b) a liquid/liquid/solid centrifugal separator including an inlet, means for separating the solid particulate matter, the oils, and the coolant fluid from one another, means for purging the separated solid particulate matter from said separator, light liquid outlet means for releasing separated oil from said separator, and heavy liquid outlet means for releasing recovered coolant fluid from said separator;
   (c) first conduit means connecting said container outlet and said separator inlet;
   (d) second conduit means connecting said separator heavy liquid outlet means and said first container inlet means;
   (e) means mounted in connection with said first conduit means for pumping fluids through said first conduit means;
   (f) a second container positioned adjacent said first container, said second container including an inlet;
   (g) third conduit means connecting said second container inlet and a portion of said second conduit means; and
   (h) valve means positioned in said second conduit means intermediate said separator second outlet means and said first container inlet means for diverting recovered coolant fluid from said second conduit means into said third conduit means for delivery to said second container.

11. The apparatus according to claim 10 wherein said pumping means includes an air-operated diaphragm type pump operably connected to a portion of said first conduit.

12. The apparatus according to claim 10 wherein said first, second, and third conduit means are each flexible tubular members.

13. The apparatus according to claim 10 wherein said valve means includes a diverter valve, said valve having a first position and a second position, said control means designed to switch said valve from said first position to said second position and back to said first position, whereby in said first position fluid flow continues uninterrupted through said second conduit means from said heavy liquid outlet means in said separator to said first container inlet means, and in said second position fluid flow is interrupted and is diverted from said second conduit means into said third conduit means and on to said second container, said control means including means for switching said valve positions at predetermined time intervals during the operation of said apparatus.

14. An apparatus designed to recover a coolant fluid from a contaminated fluid mixture, the mixture also containing various oils and solid particulate matter, said apparatus including:
   (a) means for initially removing relatively heavy and large solid particulate matter from the contaminated mixture;
   (b) a first container adapted to receive the semi-cleaned mixture, said container having a generally circular cross section, a centrally located, bottommost outlet, and inlet means for introducing a fluid into said container in a manner so as to create with said outlet a fluid vortex, said fluid vortex having a central portion defining a rotating surface through said fluid to said outlet;
   (c) a liquid/liquid/solid centrifugal separator mounted proximate said first container, said separator including an inlet, means for separating the solid particulate matter, the oils and the coolant fluid from each other, means for purging the separated solid particulate matter from said separator, first outlet means for releasing separated oil from said separator, and second outlet means for releasing recovered coolant fluid from said separator;
   (d) first conduit means connecting said first container outlet and said separator inlet;
   (e) second conduit means connecting said separator second outlet means and said first container inlet means;
   (f) means for pumping fluids through said first conduit means, said pumping means including an air-operated, diaphragm-type pump operably connected to a portion of said first conduit means;
   (g) a second container positioned adjacent said first container, said second container including an inlet, an outlet, and means for transferring fluid overflow to said first container;
   (h) third conduit means connecting said second container inlet and a portion of said second conduit means;
   (i) valve means positioned in said second conduit means intermediate said separator second outlet means and said first container inlet means for diverting recovered coolant fluid into said third conduit means for delivery to said second container, said valve means including a diverter valve having an open position whereby fluid flow continues uninterrupted through said second conduit means and a closed position whereby fluid flow through said second conduit means to said first container is prohibited, with the flow instead being diverted into said third conduit means; and
   (j) control means for alternately switching said valve means to its open position and its closed position.

15. The apparatus according to claim 14 further including means for restoring the recovered coolant fluid to a predetermined concentration level, said restoring means being mounted adjacent said second container with said second container having an opening in communication with said restoring means, means for discharging a specified amount of each coolant component into said second container through said opening, and further control for controlling the amount of coolant component released into said second container.

16. The apparatus according to claim 14 further including means for recirculating recovered coolant fluid stored in said containers through said apparatus at preset time intervals when said apparatus is not in operation, said recirculating means including means for automatically starting said pumping means and said separator after said pre-set time interval has elapsed, whereby there is prevented the occurrence of any stagnation of the recovered coolant fluid being stored in said apparatus.

17. The apparatus according to claim 14 wherein said means for initially removing relatively large and heavy solid particulate matter includes a dragout-reservoir assembly mounted adjacent said first container, said assembly including a reservoir for initially holding said contaminated mixture, dragout means mounted in said reservoir for removing solid particulate matter which has settled to the bottom of said reservoir, and conduit means for transferring the semi-cleaned contaminated mixture to said first container.

18. The apparatus according to claim 14 wherein said first, second, and third conduit means are flexible, tubular members.

* * * * *